(12) United States Patent
Ozawa et al.

(10) Patent No.: US 12,244,145 B2
(45) Date of Patent: Mar. 4, 2025

(54) POWER MANAGEMENT SYSTEM, POWER MANAGEMENT SERVER, AND POWER MANAGEMENT METHOD

(71) Applicant: TOYOTA JIDOSHA KABUSHIKI KAISHA, Toyota (JP)

(72) Inventors: Tamaki Ozawa, Toyota (JP); Toru Nakamura, Toyota (JP); Akinori Morishima, Naka-gun (JP); Yusuke Horii, Nagoya (JP); Wataru Matsumura, Ichihara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 17/818,991

(22) Filed: Aug. 11, 2022

(65) Prior Publication Data

US 2023/0060964 A1 Mar. 2, 2023

(30) Foreign Application Priority Data

Aug. 24, 2021 (JP) ................................. 2021-136118

(51) Int. Cl.
*H02J 3/00* (2006.01)
*G05B 19/042* (2006.01)
(Continued)

(52) U.S. Cl.
CPC ............ *H02J 3/004* (2020.01); *G05B 19/042* (2013.01); *H02J 3/32* (2013.01); *H02J 7/0048* (2020.01);
(Continued)

(58) Field of Classification Search
CPC .. H02J 3/004; H02J 3/32; H02J 7/0048; H02J 7/00712
See application file for complete search history.

(56) References Cited

U.S. PATENT DOCUMENTS

2011/0137591 A1  6/2011  Ishibashi
2021/0156926 A1* 5/2021  Knudson ............... G06F 1/3212

FOREIGN PATENT DOCUMENTS

JP          2011-124287 A     6/2011
WO    WO 2018/003947 A1     1/2018

OTHER PUBLICATIONS

Tanaka, K. et al., "Dynamic energy management method for power systems with large-scale storage batteries and photovoltaic cells", 2013 International Conference on Clean Electrical Power (ICCEP), IEEE, Jun. 11, 2013, pp. 268-274.

* cited by examiner

*Primary Examiner* — Mark A Connolly
(74) *Attorney, Agent, or Firm* — Finnegsh, Henderson, Farabow, Garrett and Dunner LLP

(57) ABSTRACT

A power management system includes a photovoltaic power generator connected to a power network, an energy storage device configured to be connected to the power network, and a server. The server is configured to: acquire a predicted value of solar radiation at a prediction time at a point where the photovoltaic power generator is installed; calculate a predicted value of power generated by the photovoltaic power generator at the prediction time by using the predicted value of solar radiation; set a target range of an SOC of the energy storage device by using the predicted value, and control the SOC in such a way that the SOC falls within the target range by the prediction time; and set the target range to a wider range when reliability of the predicted value is low than when the reliability of the predicted value is high.

6 Claims, 5 Drawing Sheets

(51) Int. Cl.
*H02J 3/32* (2006.01)
*H02J 7/00* (2006.01)
(52) U.S. Cl.
CPC .. *H02J 7/00712* (2020.01); *G05B 2219/2639* (2013.01); *H02J 2300/24* (2020.01)

POWER MANAGEMENT SYSTEM, POWER MANAGEMENT SERVER, AND POWER MANAGEMENT METHOD

CROSS-REFERENCE TO RELATED APPLICATION

This application claims priority to Japanese Patent Application No. 2021-136118 filed on Aug. 24, 2021, incorporated herein by reference in its entirety.

BACKGROUND

1. Technical Field

The present disclosure relates to management of power generated using a photovoltaic power generator.

2. Description of Related Art

Examples of power balancing resources for a power network such as microgrid include a generator, a variable renewable energy source, an energy storage system, charging equipment, and a vehicle equipped with an energy storage device. An example of the variable renewable energy source is a photovoltaic power generator such as solar panel. When a photovoltaic power generator is installed in an area for a microgrid, power generated by the photovoltaic power generator needs to be accurately predicted for accurate power balancing.

For example, Japanese Unexamined Patent Application Publication No. 2011-124287 (JP 2011-124287 A) discloses a technique of predicting solar radiation and calculating the power generated by the photovoltaic power generator from information on the predicted solar radiation.

SUMMARY

The above predicted information on solar radiation is provided by various institutions such as the Japan Meteorological Agency, but is not always reliable, and the predicted value of solar radiation may deviate significantly from actual solar radiation. Therefore, the prediction accuracy of the power generated by the photovoltaic power generator decreases, and the actual generated power may be excessively larger or smaller than the predicted generated power. As a result, it is required to appropriately absorb or make up for the surplus or shortage of the generated power.

The present disclosure provides a power management system, power management server, and power management method that appropriately absorb or make up for the surplus or shortage of generated power in a power network to which a photovoltaic power generator is connected.

An aspect of the present disclosure relates to a power management system that manages power of a power network installed in a predetermined area. The power management system includes a photovoltaic power generator installed in the predetermined area and connected to the power network, an energy storage device configured to be connected to the power network, and a server. The server is configured to: acquire a predicted value of solar radiation at a prediction time at a point where the photovoltaic power generator is installed; calculate a predicted value of power generated by the photovoltaic power generator at the prediction time by using the predicted value of solar radiation; set a target range of an SOC of the energy storage device by using the predicted value, and control the SOC in such a way that the SOC falls within the target range by the prediction time; and set the target range to a wider range when reliability of the predicted value is low than when the reliability of the predicted value is high.

With this configuration, when the reliability of the predicted value of solar radiation is low, the generated power may be excessively larger or smaller than the predicted value. Accordingly, setting the target range of the state of charge (SOC) of the battery to a wider range in preparation for the generated power becoming excessively larger or smaller than the predicted value makes it possible to appropriately absorb the surplus of the generated power or appropriately make up for the shortage of the generated power.

In the above aspect, the server may be configured to, when the energy storage device is to be charged with a part of the generated power at the prediction time, set a lower limit of the target range to a lower value when the reliability of the predicted value is low than when the reliability of the predicted value is high.

With this configuration, for example, in the case where the energy storage device is charged with the surplus of the power generated by the photovoltaic power generator, the lower limit of the target value is set to a lower value when the reliability of the predicted value is low. Accordingly, the surplus of the generated power can be absorbed by the energy storage device even when the generated power is excessively larger than the predicted value due to the low reliability of the predicted value.

In the above aspect, the server may be configured to, when power of the energy storage device together with the generated power is to be fed to outside of the power network at the prediction time, set an upper limit of the target range to a higher value when the reliability of the predicted value is low than when the reliability of the predicted value is high.

With this configuration, for example, when power is fed from the energy storage device to make up for the shortage of the power generated by the photovoltaic power generator, the upper limit of the target value is set to a higher value when the reliability of the predicted value is low. Accordingly, the shortage of the generated power can be made up for by the power of the energy storage device even when the generated power is excessively smaller than the predicted value due to the low reliability of the predicted value.

In the above aspect, the server may be configured to calculate the reliability by using an error rate calculated from a measured value of solar radiation and a predicted value of solar radiation of the same time.

With this configuration, the reliability can be accurately calculated by using the error rate calculated from the measured and predicted values of solar radiation of the same time.

Another aspect of the present disclosure relates to a power management server that manages power of a power network installed in a predetermined area. A photovoltaic power generator installed in the predetermined area and an energy storage device are connected to the power network. The power management server includes a processor. The processor is configured to: acquire a predicted value of solar radiation at a prediction time at a point where the photovoltaic power generator is installed; calculate a predicted value of power generated by the photovoltaic power generator at the prediction time by using the predicted value of solar radiation; set a target range of an SOC of the energy storage device by using the predicted value; control the SOC in such a way that the SOC falls within the target range by the prediction time; and set the target range to a wider range when reliability of the predicted value is low than when the reliability of the predicted value is high.

Another aspect of the present disclosure relates to a power management method for managing power of a power network installed in a predetermined area. A photovoltaic power generator installed in the predetermined area and an energy storage device are connected to the power network. The power management method includes: acquiring a predicted value of solar radiation at a prediction time at a point where the photovoltaic power generator is installed; calculating a predicted value of power generated by the photovoltaic power generator at the prediction time by using the predicted value of solar radiation; setting a target range of an SOC of the energy storage device by using the predicted value; controlling the SOC in such a way that the SOC falls within the target range by the prediction time; and setting the target range to a wider range when reliability of the predicted value is low than when the reliability of the predicted value is high.

According to the present disclosure, it is possible to provide a power management system, power management server, and power management method that appropriately absorb or make up for the surplus or shortage of generated power in a power network to which a photovoltaic power generator is connected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated.

Figure 1:
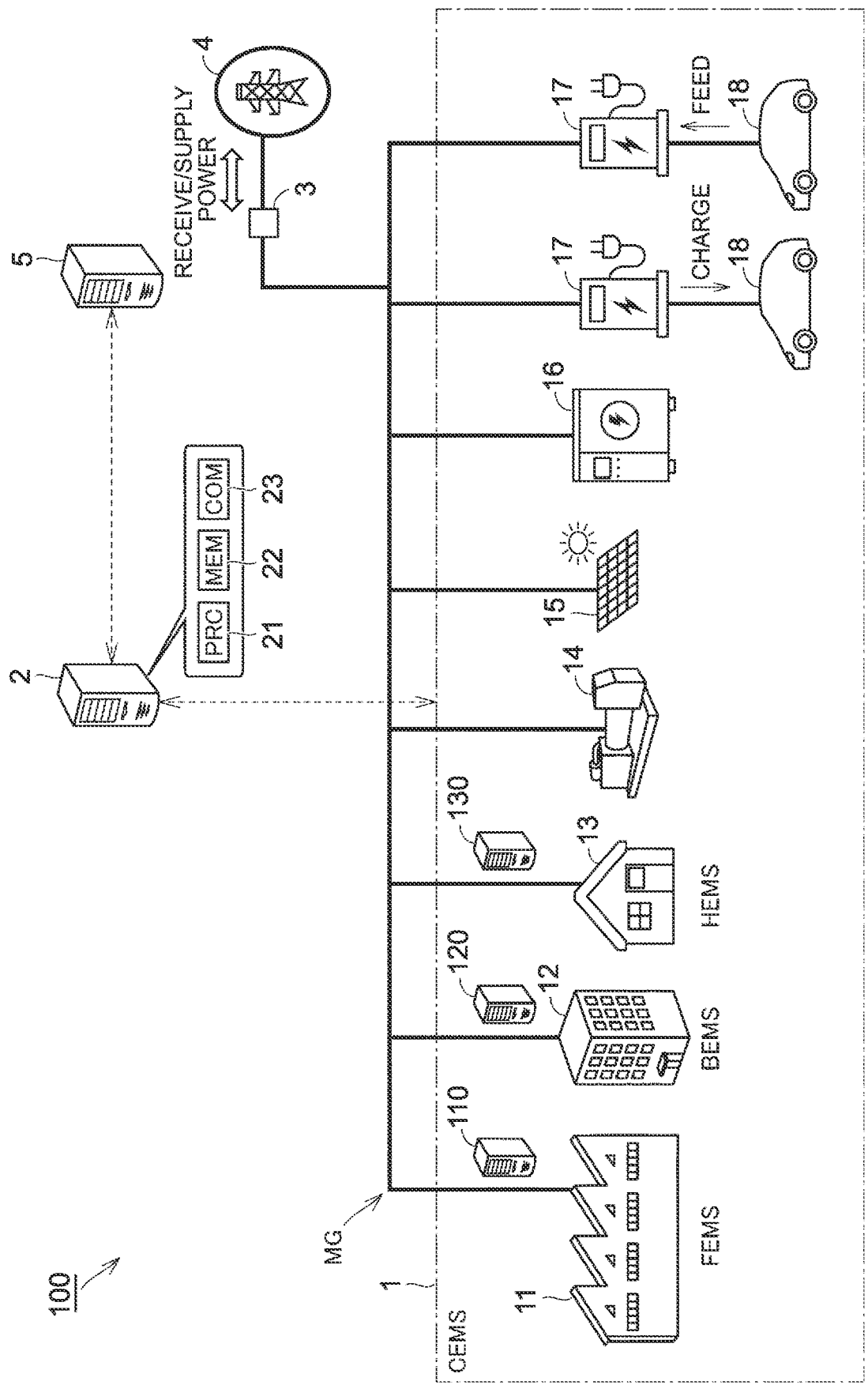
FIG. 1 shows a schematic configuration of a power management system according to an embodiment.

FIG. 1 shows a schematic configuration of a power management system 100 according to an embodiment. The power management system 100 includes, for example, a CEMS 1, a CEMS server 2, a power receiving and transforming facility 3, a power grid 4, and a power transmission and distribution operator server 5. The term "CEMS" means a community energy management system or a city energy management system.

The CEMS 1 includes a factory energy management system (FEMS) 11, a building energy management system (BEMS) 12, a home energy management system (HEMS) 13, a generator 14, a variable renewable energy source 15, an energy storage system (ESS) 16, electric vehicle supply equipment (EVSE) 17, and a vehicle 18. In the CEMS 1, these components form a microgrid MG. The microgrid MG is an example of the "power network" according to the present disclosure.

The FEMS 11 is a system that manages supply and demand of power that is used in a factory. The FEMS 11 includes a factory building (including lighting fixtures and air conditioning unit) and an industrial facility (production line etc.) that are operated by power supplied from the microgrid MG. Although not shown in the figure, the FEMS 11 may include power generation equipment (generator etc.) installed in the factory. Power generated by the power generation equipment may be supplied to the microgrid MG. The FEMS 11 further includes an FEMS server 110 capable of bidirectional communication with the CEMS server 2.

The BEMS 12 is a system that manages supply and demand of power that is used in a building such as office or commercial facility. The BEMS 12 includes lighting fixtures and air conditioning units installed in the building. The BEMS 12 may include power generation equipment and may include a cold heat source system (waste heat recovery system, thermal energy storage system, etc.). The BEMS 12 further includes a BEMS server 120 capable of bidirectional communication with the CEMS server 2.

The HEMS 13 is a system that manages supply and demand of power that is used at home. The HEMS 13 includes household appliances (lighting fixtures, air conditioner, other electric appliances, etc.) that are operated by power supplied from the microgrid MG. The HEMS 13 may include a home heat pump system, a home cogeneration system, and a home energy storage battery. The HEMS 13 further includes an HEMS server 130 capable of bidirectional communication with the CEMS server 2.

The generator 14 is power generation equipment that does not depend on weather conditions. The generator 14 outputs generated power to the microgrid MG. The generator 14 may include a steam turbine generator, a gas turbine generator, a diesel engine generator, a gas engine generator, a biomass generator, and a stationary fuel cell. The generator 14 may include a cogeneration system that uses heat generated during power generation.

The variable renewable energy source 15 is power generation equipment whose power generation output varies depending on weather conditions. The variable renewable energy source 15 outputs generated power to the microgrid MG. Although FIG. 1 illustrates a photovoltaic power generator 15A (FIG. 2) such as solar panel, the variable renewable energy source 15 may include a wind power generator in addition to the photovoltaic power generator 15A.

The energy storage system 16 is a stationary power source that stores power generated by the variable renewable energy source 15 etc. The energy storage system 16 is a secondary battery and is, for example, a lithium-ion battery or nickel metal hydride battery that is a battery used in a vehicle (recycled product). However, the energy storage system 16 is not limited to the secondary battery, and may be a power-to-gas device that produces gaseous fuel (hydrogen, methane, etc.) using surplus power.

The electric vehicle supply equipment 17 is electrically connected to the microgrid MG, and is configured to perform charging and discharging (power feeding) from and to the microgrid MG.

Specific examples of the vehicle 18 include a plug-in hybrid electric vehicle (PHEV) and a battery electric vehicle (BEV). The vehicle 18 is configured to perform either or both of external charging and external feeding. That is, the vehicle 18 is configured so that power can be supplied from the microgrid MG to the vehicle 18 when a charging cable is connected to an inlet (not shown) of the vehicle 18 (external charging). The vehicle 18 is also configured so that power can be fed from the vehicle 18 to the microgrid MG when the charging cable is connected to an outlet (not shown) of the vehicle 18 (external feeding).

In the example shown in FIG. 1, the CEMS 1 includes one FEMS 11, one BEMS 12, one HEMS 13, one generator 14, one variable renewable energy source 15, and one energy storage system 16. However, the CEMS 1 may include any number of such systems or pieces of equipment. The CEMS 1 may include a plurality of such systems or pieces of equipment, or may not include any of such systems or pieces of equipment. Each of the FEMS 11 (factory building, industrial facility, etc.), the BEMS 12 (lighting fixtures, air conditioning units, etc.), the HEMS 13 (household appliances etc.), the generator 14, the variable renewable energy source 15, the energy storage system 16, the electric vehicle supply equipment 17, and the vehicle 18 that are included in the CEMS 1 corresponds to the "power balancing resource" according to the present disclosure. These systems or pieces of equipment are therefore hereinafter sometimes referred to as "power balancing resource" unless individually identified.

The CEMS server 2 is a computer that manages the power balancing resource in the CEMS 1. The CEMS server 2 includes a control device 21, a storage device 22, and a communication device 23. The control device 21 includes a processor and is configured to perform a predetermined arithmetic process. The storage device 22 includes a memory storing programs to be executed by the control device 21, and stores various kinds of information (maps, relational expressions, parameters, etc.) to be used in the programs. The communication device 23 includes a communication interface and is configured to communicate with the outside (other server etc.).

The CEMS server 2 may be an aggregator server. An aggregator is an electric utility that bundles multiple power balancing resources to provide an energy management service. The CEMS server 2 corresponds to the "power management server" according to the present disclosure.

The power receiving and transforming facility 3 is provided at an interconnection point (network connection point) of the microgrid MG, and is configured to switch between parallel-on (connection) and parallel-off (disconnection) of the microgrid MG and the power grid 4. Although not shown in the figure, the power receiving and transforming facility 3 includes a high-voltage (primary) switchgear, a transformer, a protective relay, a measuring device, and a control device. When the microgrid MG is connected to the power grid 4, the power receiving and transforming facility 3 receives alternating current power of, for example, extra high voltage (voltage higher than 7000 V) from the power grid 4, steps down the voltage of the received power, and supplies the resultant power to the microgrid MG.

The power grid 4 is a power network composed of power plants and power transmission and distribution equipment. In the present embodiment, an electric power company serves as both a power producer and a power transmission and distribution operator. The electric power company is a general power transmission and distribution operator and is also an administrator of the power grid 4, and maintains and manages the power grid 4.

The power transmission and distribution operator server 5 is a computer that belongs to the electric power company and manages power supply and demand of the power grid 4. The power transmission and distribution operator server 5 is also capable of bidirectional communication with the CEMS server 2.

As described above, the power management system 100 having the above configuration includes the photovoltaic power generator 15A such as solar panel as the variable renewable energy source 15 that is used as the power balancing resource for the microgrid MG. When the photovoltaic power generator 15A is installed in a predetermined area for the microgrid MG, power generated by the photovoltaic power generator 15A needs to be accurately predicted for accurate power balancing. One way to accurately predict the power generated by the photovoltaic power generator 15A is to predict solar radiation and calculate power generated by the photovoltaic power generator 15A or the amount of power generated by the photovoltaic power generator 15A from information on the predicted solar radiation.

Figure 2:
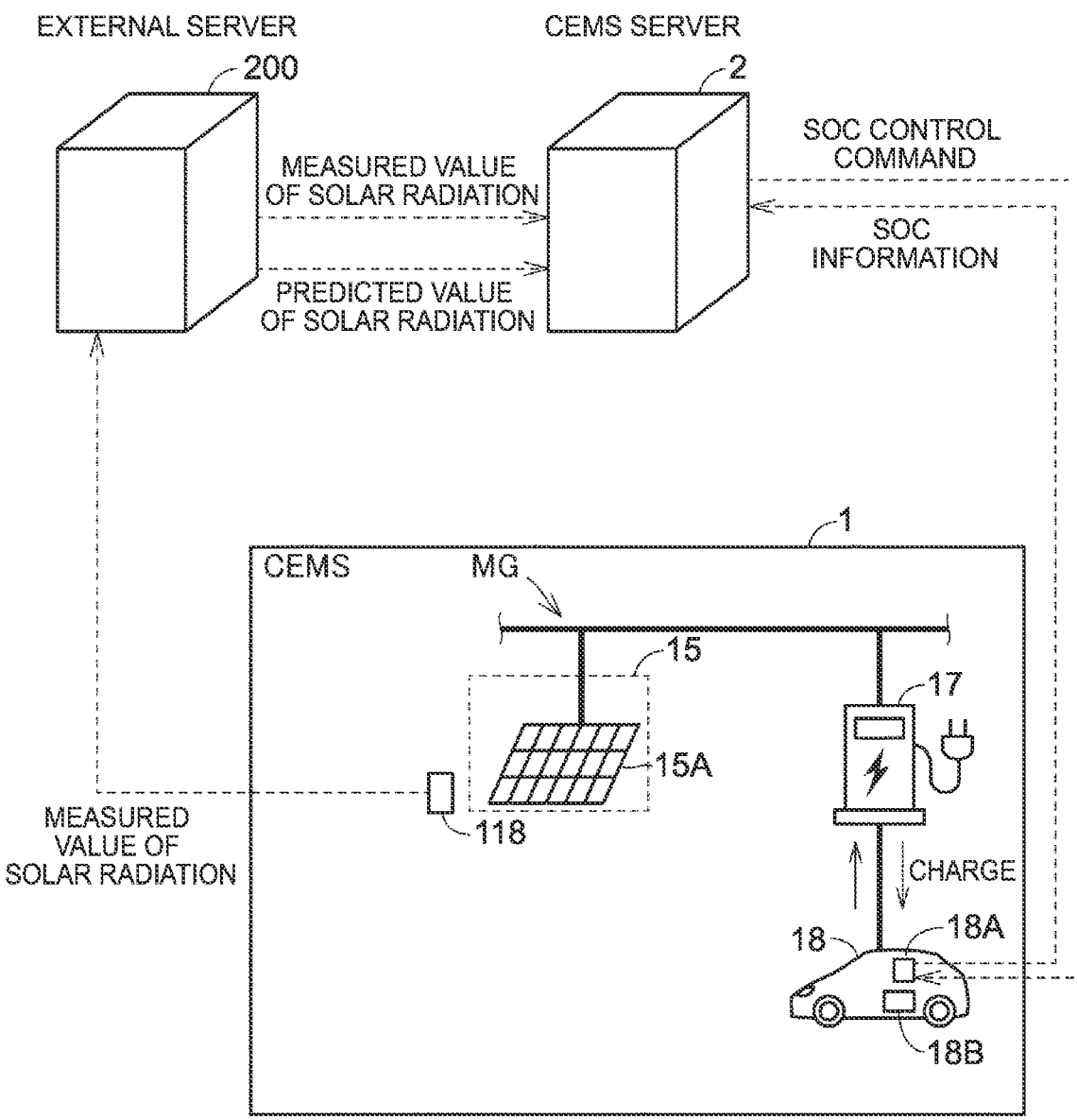
FIG. 2 illustrates an example of a configuration for predicting power generated by a photovoltaic power generator.

FIG. 2 illustrates an example of a configuration for predicting power generated by the photovoltaic power generator 15A. As shown in FIG. 2, the CEMS server 2 acquires from an external server 200, for example, information indicating a measured value of solar radiation at a point where the photovoltaic power generator 15A is installed and information indicating a predicted value of solar radiation at a time later than the current time. The external server 200 includes, for example, a server of the Japan Meteorological Agency and a server of an institution that provides information on solar radiation to the outside. The vehicle 18 includes an electronic control unit (ECU) 18A and a battery 18B. The CEMS server 2 is configured to communicate either wired or wirelessly with the ECU 18A of the vehicle 18.

A pyranometer 118 is installed at the point where the photovoltaic power generator 15A is installed. The pyranometer 118 detects solar radiation and sends information indicating the detection result to the external server 200. The external server 200 calculates a predicted value of solar radiation at a time later than the current time by using, for example, the history of measured values of solar radiation acquired from the pyranometer 118 installed at the point where the photovoltaic power generator 15A is installed. For example, the external server 200 may calculate the average of the measured values of solar radiation of the same time on the same date of the past several years as the predicted value, or may calculate the predicted value using the distribution of atmospheric pressure, machine learning, etc. The external server 200 need only be able to calculate a predicted value of solar radiation using a known technique, and the method of calculating a predicted value of solar radiation is not particularly limited to the above method. The external server 200 stores the measured and predicted values of solar radiation of the same time at the point where the photovoltaic power generator 15A is installed in a storage device (not shown) in association with each other. When the external server 200 receives from the CEMS server 2 a request for information on solar radiation at the point where the photovoltaic power generator 15A is installed, the external server 200 sends information on the measured and predicted values of solar radiation at this point to the CEMS server 2.

The CEMS server 2 can calculate power generated at a prediction time at the point where the photovoltaic power generator 15A is installed by using the predicted value of solar radiation. The prediction time may be, for example, a predetermined amount of time (e.g., 30 minutes or one hour) from the current time or may be the time when power balancing is performed in the microgrid MG or between the microgrid MG and the power grid 4. The CEMS server 2 can calculate a predicted value of power generated by the photovoltaic power generator 15A at the prediction time by using the predicted value of solar radiation at the point where the photovoltaic power generator 15A is installed.

When the CEMS server 2 supplies power from the microgrid MG to the power grid 4 in response to, for example, a demand response (DR) request and the power generated in the microgrid MG during the day etc. is larger than the power requested from the power grid 4 (hereinafter sometimes referred to as "requested power"), the microgrid MG has surplus power, and it is therefore required to absorb the surplus power in the microgrid MG. An example of means for absorbing such surplus power is the battery 18B mounted on the vehicle 18. When the battery 18B is used to absorb the surplus power, it is required to control the state of charge (SOC) of the battery 18B to such a value that the battery 18B can absorb the surplus power by the time the microgrid MG has the surplus power (prediction time). Therefore, the CEMS server 2 sets a target range of the SOC of the battery 18B using the predicted value of generated power at the prediction time and the current value of the SOC of the battery 18B, and controls the SOC of the battery 18B so that the SOC of the battery 18B falls within the set target range by the prediction time.

At this time, for example, the upper limit of the target range is set to such a value that the SOC of the battery 18B will not become higher than a predetermined upper limit of the SOC even when the battery 18B is charged with the predicted surplus power. The lower limit of the target range is set to the upper limit of the target range minus a certain margin α. The ECU 18A of the vehicle 18 sets a target value to the lowest possible value within the target range. For example, the ECU 18A sets a target value using, for example, the current SOC of the battery 18B, the upper limit of charging power of the battery 18B, the upper limit of feeding power of the battery 18B, and the time until the prediction time.

The CEMS server 2 receives information on the SOC of the battery 18B (SOC information) from the ECU 18A of the vehicle 18, and sends to the vehicle 18 a control command to control the SOC of the battery 18B so that the SOC falls within the set target range (SOC control command).

On the other hand, for example, when the CEMS server 2 supplies power from the microgrid MG to the power grid 4 and the power generated in the microgrid MG is less than the requested power, not enough power is supplied from the photovoltaic power generator 15A to the power grid 4. It is therefore required to make up for the shortage of power within the microgrid MG. An example of means for making up for such a shortage of power is the battery 18B mounted on the vehicle 18. When the battery 18B is used to make up for the shortage of power, it is required to control the SOC of the battery 18B to such a value that the battery 18B can make up for the shortage of power by the time the shortage of power occurs (prediction time). Therefore, the CEMS server 2 sets a target range of the SOC of the battery 18B using the predicted value of generated power at the prediction time, and controls the SOC of the battery 18B so that the SOC of the battery 18B falls within the set target range by the prediction time.

At this time, for example, the lower limit of the target range is set to such a value that the SOC of the battery 18B will not become lower than a predetermined lower limit of the SOC even when the battery 18B feeds the amount of power corresponding to the predicted shortage of power. The upper limit of the target range is set to the lower limit of the target range plus the certain margin α. The ECU 18A of the vehicle 18 sets a target value to the highest possible value within the target range. For example, the ECU 18A sets a target value using, for example, the current SOC of the battery 18B, the upper limit of charging power of the battery 18B, the upper limit of feeding power of the battery 18B, and the time until the prediction time.

The above predicted information on solar radiation is provided by various institutions such as the Japan Meteorological Agency, but is not always reliable. When the reliability of the predicted value is low, the predicted value of solar radiation is highly likely to deviate significantly from actual solar radiation. Therefore, depending on the reliability of the predicted value, the prediction accuracy of the power generated by the photovoltaic power generator 15A decreases, and the actual generated power may be excessively larger or smaller than the predicted generated power. As a result, it is required to appropriately absorb or make up for the surplus or shortage of the generated power.

In the present embodiment, when the reliability of the predicted value of solar radiation on the photovoltaic power generator 15A is low, the CEMS server 2 sets the target range of the SOC of the battery 18B to a wider range than when the reliability of the predicted value of solar radiation on the photovoltaic power generator 15A is high.

When the reliability of the predicted value of solar radiation is low, the generated power may be excessively larger or smaller than the predicted value. Accordingly, setting the target range of the SOC of the battery 18B to a wider range in preparation for the generated power becoming excessively larger or smaller than the predicted value makes it possible to appropriately absorb the surplus of the generated power or appropriately make up for the shortage of the generated power.

Figure 3:
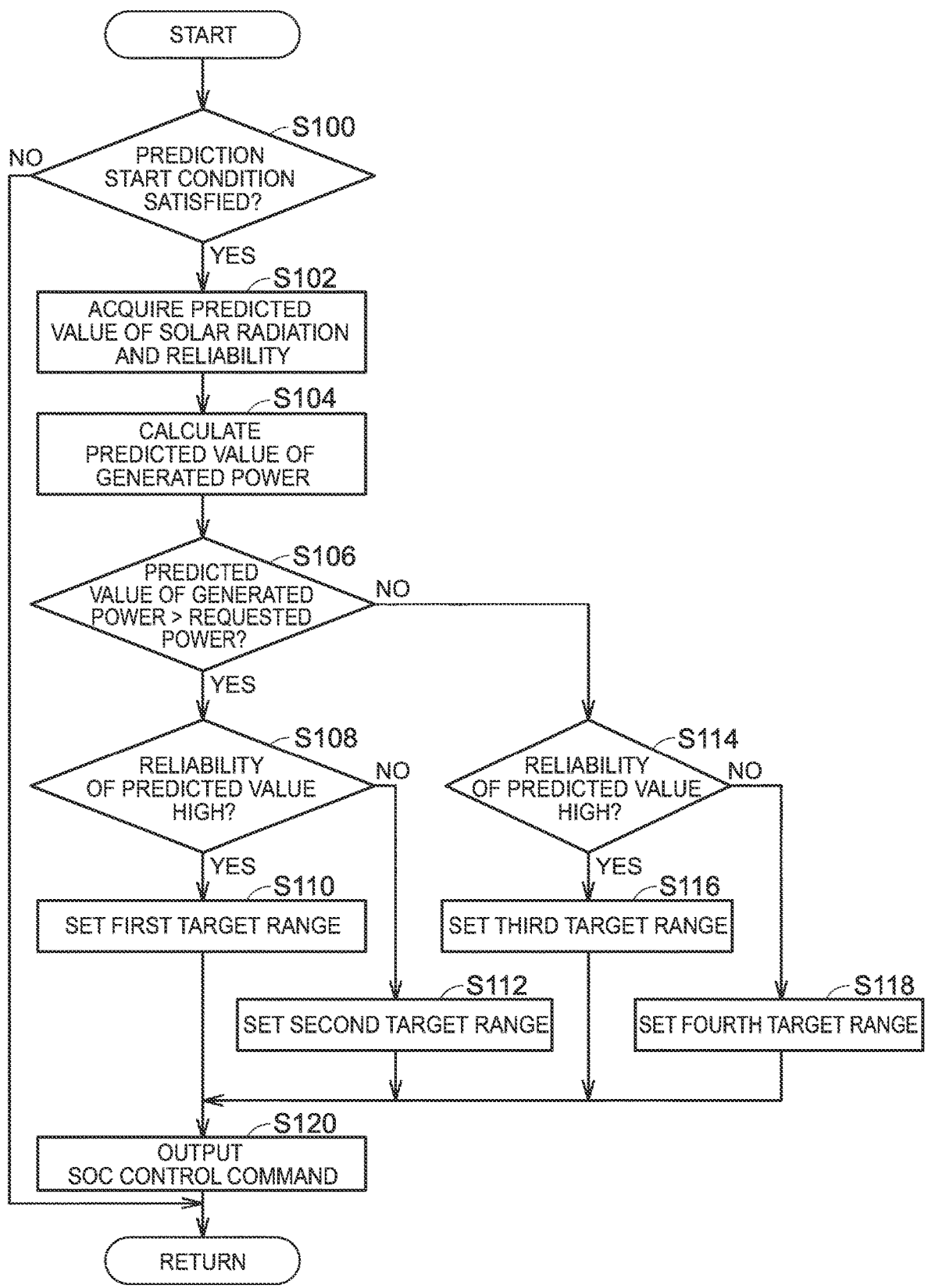
FIG. 3 is a flowchart showing an example of a process that is performed by a community or city energy management system (CEMS) server.

Hereinafter, an example of a process that is performed by the CEMS server 2 will be described with reference to FIG. 3. FIG. 3 is a flowchart showing an example of a process that is performed by the CEMS server 2. The series of steps shown in this flowchart are repeatedly performed in predetermined control cycles.

In step (step is hereinafter referred to as "S") 100, the CEMS server 2 determines whether a prediction start condition is satisfied. The prediction start condition includes, for example, a condition that it is required to predict the power generated by the photovoltaic power generator 15A at the prediction time. The CEMS server 2 determines that the condition that it is required to predict the power generated by the photovoltaic power generator 15A at the prediction time is satisfied when, for example, the power transmission and distribution operator server 5 requests that the power generated by the photovoltaic power generator 15A be supplied to the power grid 4 at the prediction time. When the CEMS server 2 determines that the prediction start condition is satisfied (YES in S100), the routine proceeds to S102.

In S102, the CEMS server 2 acquires a predicted value of solar radiation at the point where the photovoltaic power generator 15A is installed at the prediction time and information on the reliability of the predicted value. As described above, the CEMS server 2 acquires the predicted value of solar radiation at the point where the photovoltaic power generator 15A is installed at the prediction time from the external server 200. The CEMS server 2 also acquires the measured and predicted values of solar radiation at the point where the photovoltaic power generator 15A is installed at the current time, and acquires the information on the reliability of the predicted value using the acquired measured and predicted values of solar radiation at the current time. More specifically, the CEMS server 2 calculates an error rate from the measured and predicted values of solar radiation at the current time. The CEMS server 2 calculates, for example, a value calculated by a predetermined evaluation function (e.g., mean absolute percentage error (MAPE)) as the error rate. The CEMS server 2 calculates, for example, the absolute value of the difference between the predicted and measured values at the current time divided by the measured value as the error rate. The CEMS server 2 may acquire measured and predicted values at a plurality of times before the current time, calculate error rates at the plurality of times, and use the average of the error rates as a final error rate. Alternatively, in the case where the external server 200 calculates such an error rate, the CEMS server 2 may acquire the error rate acquired from the external server 200 as the reliability of the predicted value of solar radiation at the prediction time.

In S104, the CEMS server 2 calculates a predicted value of the generated power at the prediction time from the acquired predicted value of solar radiation. For example, the CEMS server 2 may calculate the predicted value of the generated power from the predicted value of solar radiation by using the conversion efficiency from the solar radiation to the generated power, or may calculate the predicted value of the generated power by using a predetermined map, table, formula etc. indicating the relationship between the solar radiation and the generated power.

In S106, the CEMS server 2 determines whether the predicted value of the generated power is larger than requested power. The CEMS server 2 determines whether the predicted value of the generated power is larger than the power requested to the photovoltaic power generator 15A or the power requested from the power grid 4. For example, the CEMS server 2 may set the power to be requested to a plurality of power supply sources in the microgrid MG by using the power requested from the power grid 4 and sets the requested power to the power to be requested to the photovoltaic power generator 15A out of the power supply sources, or may set the requested power to the power requested the power grid 4. When the CEMS server 2 determines that the predicted value of the generated power is larger than the requested power (YES in S106), the routine proceeds to S108.

In S108, the CEMS server 2 determines whether the reliability of the predicted value of solar radiation is high. For example, when the error rate calculated as described above is equal to or less than a threshold, the CEMS server 2 determines that the reliability of the predicted value of solar radiation is high. Alternatively, for example, when the error rate calculated as described above is higher than the threshold, the CEMS server 2 determines that the reliability of the predicted value of solar radiation is low. When the CEMS server 2 determines that the reliability of the predicted value of solar radiation is high (YES in S108), the routine proceeds to S110.

In S110, the CEMS server 2 sets a first target range of the SOC of the battery 18B. At this time, for example, the upper limit of the first target range is set to such a value that the SOC of the battery 18B will not become higher than a predetermined upper limit of the SOC even when the battery 18B is charged with predicted surplus power. The lower limit of the first target range is set to the upper limit of the first target range minus the certain margin α. This lower limit of the first target range is hereinafter referred to as "first lower limit." When the CEMS server 2 determines that the reliability of the predicted value of solar radiation is not high (low) (NO in S108), the routine proceeds to S112.

In S112, the CEMS server 2 sets a second target range of the SOC of the battery 18B. At this time, the upper limit of the second target range is set to the same value as the upper limit of the first target range, and the lower limit of the second target range is set to the upper limit of the second target range minus a certain margin β. This lower limit of the second target range is hereinafter referred to as "second lower limit." The magnitude of the margin β is larger than the magnitude of the margin α. That is, the second target range is wider than the first target range. When the CEMS server 2 determines that the predicted value of the generated power is equal to or less than the requested power (NO in S106), the routine proceeds to S114.

In S114, the CEMS server 2 determines whether the reliability of the predicted value of solar radiation is high. Since the method for determining the reliability is similar to that in S108 described above, detailed description thereof will not be repeated. When the CEMS server 2 determines that the reliability of the predicted value of solar radiation is high (YES in S114), the routine proceeds to S116.

In S116, the CEMS server 2 sets a third target range of the SOC of the battery 18B. At this time, for example, the lower limit of the third target range is set to such a value that the SOC of the battery 18B will not become lower than a predetermined lower limit of the SOC even when the battery 18B feeds the amount of power corresponding to the predicted shortage of power. The upper limit of the third target range is set to the lower limit of the third target range plus the certain margin α. This upper limit of the third target range is hereinafter referred to as "first upper limit." When the CEMS server 2 determines that the reliability of the predicted value of solar radiation is not high (NO in S114), the routine proceeds to S118.

In S118, the CEMS server 2 sets a fourth target range of the SOC of the battery 18B. At this time, the lower limit of the fourth target range is set to the same value as the lower limit of the third target range, and the upper limit of the fourth target range is set to the lower limit of the fourth target range plus the certain margin β. This upper limit of the fourth target range is hereinafter referred to as "second upper limit."

In S120, the CEMS server 2 outputs to the vehicle 18 an SOC control command to control the SOC of the battery 18B so that the SOC falls within the set target range. The ECU 18A of the vehicle 18 controls the SOC of the battery 18B so that the SOC falls within the target range received as the SOC control command. When the battery 18B is to be charged at the prediction time, the ECU 18A controls the SOC of the battery 18B to a value as close as possible to the lower limit (first lower limit or second lower limit) of the set target range. On the other hand, when power is to be fed from the battery 18B at the prediction time, the ECU 18A controls the SOC of the battery 18B to a value as close as possible to the upper limit (first upper limit or second upper limit) of the set target range. The ECU 18A sets a target value within the target range using, for example, the current SOC and the time from the current time to the prediction start time, and controls the SOC of the battery 18B so that the SOC becomes equal to the target value by the prediction time. The ECU 18A may reduce the SOC of the battery 18B by, for example, feeding power to any consumption equipment in the microgrid MG or charging equipment other than the EVSE 17 or operating an electric device in the vehicle 18. Alternatively, the ECU 18A may increase the SOC of the battery 18B by receiving power supplied from any power supply equipment in the microgrid MG via the EVSE 17.

Figure 4:
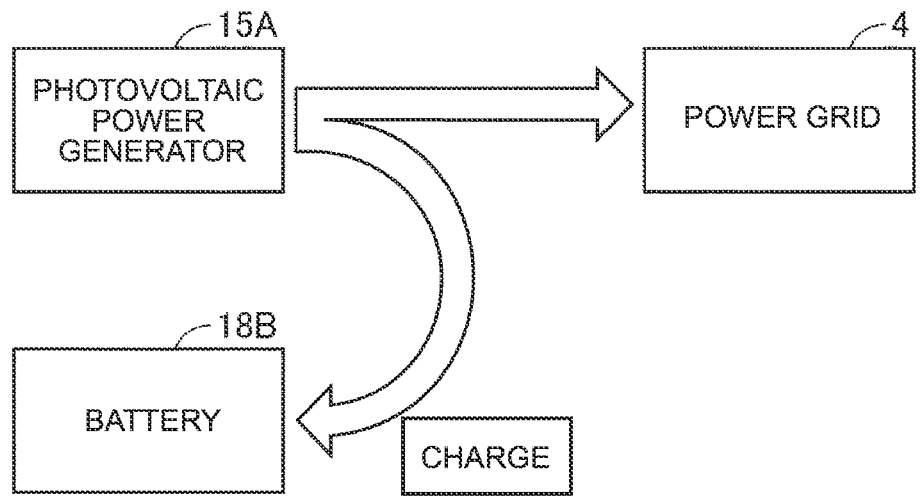
FIG. 4 illustrates the flow of power among the photovoltaic power generator, a power grid, and a battery when a predicted value of generated power is larger than requested power.
Figure 5:
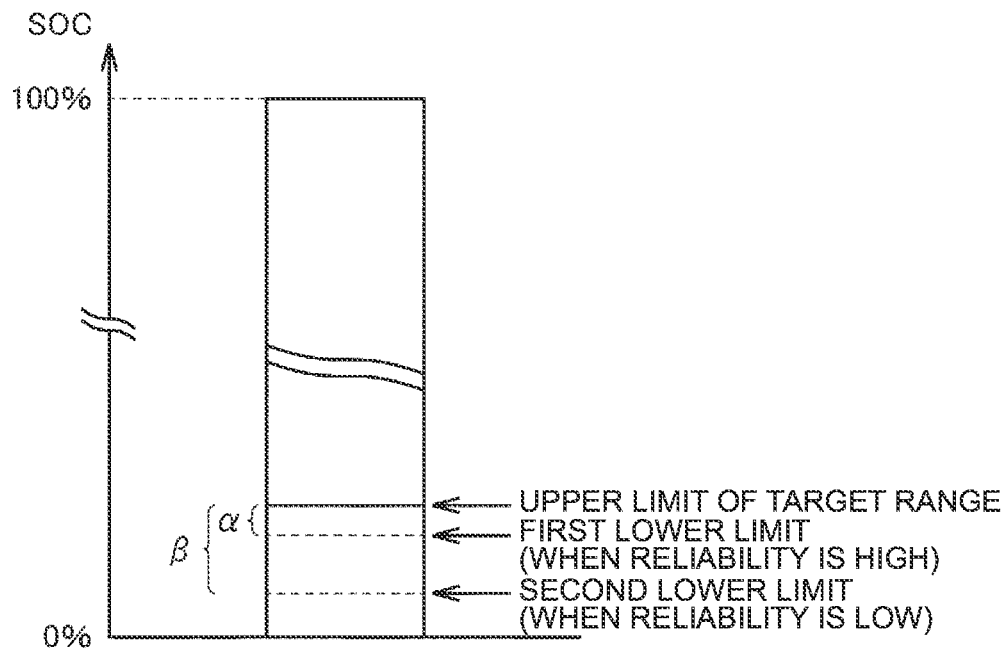
FIG. 5 is a graph illustrating a first target range and a second target range.
Figure 6:
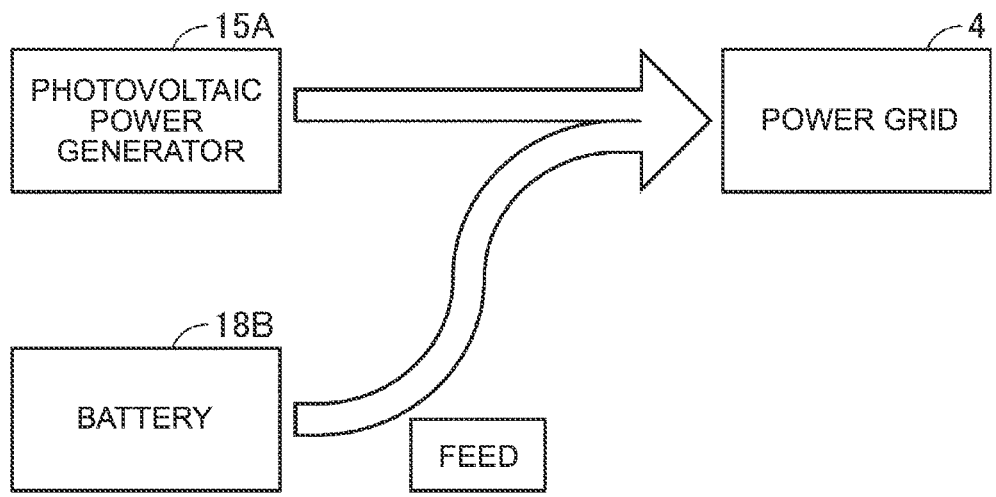
FIG. 6 illustrates the flow of power among the photovoltaic power generator, the power grid, and the battery when the predicted value of generated power is smaller than the requested power.
Figure 7:
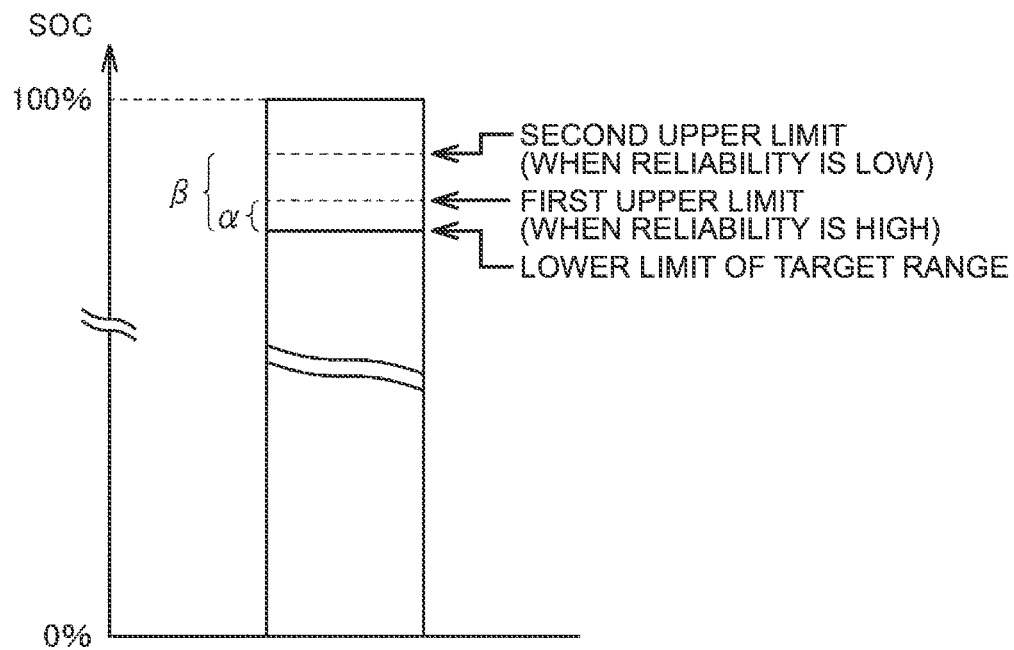
FIG. 7 is a graph illustrating a third target range and a fourth target range.

An example of the operation of the CEMS server 2 in the present embodiment based on the above structure and flowchart will be described with reference to FIGS. 4 to 7. FIG. 4 illustrates the flow of power among the photovoltaic power generator 15A, the power grid 4, and the battery 18B when the predicted value of the generated power is larger than the requested power. FIG. 5 illustrates the first target range and the second target range. FIG. 5 shows the SOC of the battery 18B by a bar graph, and shows the upper and lower limits of the set target range in the area in the bar. FIG. 6 illustrates the flow of power among the photovoltaic power generator 15A, the power grid 4, and the battery 18B when the predicted value of the generated power is smaller than the requested power. FIG. 7 illustrates the third target range and the fourth target range. FIG. 7 shows the SOC of the battery 18B by a bar graph, and shows the upper and lower limits of the set target range in the area in the bar.

For example, it is herein assumed that it is requested the power generated by the photovoltaic power generator 15A be supplied to the power grid 4 at the prediction time that is a predetermined amount of time from the current time. When it is required to predict the generated power and thus the prediction start condition is satisfied (YES in S100), a predicted value of solar radiation at the prediction time and information on the reliability of the predicted value (e.g., history information on measured and predicted values of solar radiation at and before the current time) are acquired from the external server 200 (S102). A predicted value of the power generated by the photovoltaic power generator 15A is calculated using the predicted value of solar radiation at the prediction time (S104). When it is determined that the calculated predicted value of the generated power is larger than the power requested to the photovoltaic power generator 15A (YES in S106) and it is determined that the reliability of the predicted value is high (YES in S108), the first target range is set (S110), and an SOC control command is output to the vehicle 18 (S120).

As shown in FIG. 4, when it is determined that the predicted value of the generated power is larger than the requested power, a part of the generated power that corresponds to the requested power will be supplied from the photovoltaic power generator 15A to the power grid 4 at the prediction time, and the remaining part of the generated power, namely the surplus, will be supplied to the battery 18B. Therefore, the battery 18B will be charged with the surplus at the prediction time.

When the reliability of the predicted value of solar radiation is high, the predicted value of the generated power is unlikely to vary significantly, and the surplus of the generated power is unlikely to vary significantly. Therefore, as shown in FIG. 5, even when the SOC is controlled to fall within the first target range and the battery 18B is charged with the surplus of the generated power, the generated surplus can be absorbed using the battery 18B.

On the other hand, when the calculated predicted value of the generated power is larger than the requested power (YES in S106) and the reliability of the predicted value of solar radiation is low (NO in S108), the second target range is set (S112), and an SOC control command is output to the vehicle 18 (S120).

When the reliability of the predicted value of solar radiation is low, the predicted value of the generated power is likely to vary significantly. In this case, when the surplus of the generated power is excessively smaller than predicted, the surplus can be absorbed by the battery 18B. However, when the surplus of the generated power is excessively larger than predicted, charging the battery 18B with the surplus may increase the SOC of the battery 18B to a value higher than a predetermined upper limit. Therefore, by setting the second target range and controlling the SOC of the battery 18B to a value close to the lower limit (second lower limit) of the second target range, the SOC of the battery 18B can be made lower than the first lower limit of the first target range at the prediction time. Accordingly, even when the surplus of the generated power is excessively larger than predicted, the generated surplus can be absorbed using the battery 18B.

On the other hand, when the calculated predicted value of the generated power is equal to or less than the requested power (NO in S106) and the reliability of the predicted value of solar radiation is high (YES in S114), the third target range is set (S116), and an SOC control command is output to the vehicle 18 (S120).

As shown in FIG. 6, when it is determined that the predicted value of the generated power is smaller than the requested power, all of the generated power will be supplied to the power grid 4 and the amount of power corresponding to the shortage will be supplied from the battery 18B at the prediction time. Power will thus be fed from the battery 18B. The battery 18B will feed power to make up for the shortage at the prediction time.

When the reliability of the predicted value of solar radiation is high, the predicted value of the generated power is unlikely to vary significantly, and the shortage of the generated power is unlikely to vary significantly. Therefore, as shown in FIG. 7, even when the SOC of the battery 18B is controlled to fall within the third target range and the battery 18B feeds the amount of power corresponding to the shortage of the generated power, the battery 18B can make up for the shortage of the power without the SOC becoming lower than a predetermined lower limit.

On the other hand, when the calculated predicted value of the generated power is equal to or less than the requested power (NO in S106) and the reliability of the predicted value of solar radiation is low (NO in S114), the fourth target range is set (S118), and an SOC control command is output to the vehicle 18 (S120).

When the reliability of the predicted value of solar radiation is low, the predicted value of the generated power is likely to vary significantly. In this case, when the generated power is excessively larger than the predicted value and the shortage of the power is smaller than predicted, the shortage of the power can be made up for by the power fed from the battery 18B. However, when the generated power is excessively smaller than the predicted value and the shortage of the power is larger than predicted, feeding power from the battery 18B to make up for the shortage may reduce the SOC of the battery 18B to a value lower than the predetermined lower limit. Therefore, by setting the fourth target range and controlling the SOC of the battery 18B to a value close to the upper limit (second upper limit) of the fourth target range, the SOC of the battery 18B can be made higher than the first upper limit of the third target range at the prediction time. Accordingly, even when the shortage of the power is larger than predicted, the shortage can be made up for by the power fed from the battery 18B.

As described above, according to the power management system 100 of the present embodiment, when the reliability of the predicted value of solar radiation is low, the generated power may be excessively larger or smaller than the predicted value. Accordingly, setting the target range of the SOC of the battery 18B to a wider range in preparation for the generated power becoming excessively larger or smaller than the predicted value makes it possible to appropriately absorb the surplus of the generated power or appropriately make up for the shortage of the generated power. Therefore, it is possible to provide a power management system, power management server, and power management method that appropriately absorb or make up for the surplus or shortage of generated power in a power network to which a photovoltaic power generator is connected.

In particular, when the battery 18B is to be charged with a part of the generated power at the prediction time, the lower limit of the target range is set to a lower value when the reliability of the predicted value is low than when the reliability of the predicted value is high. Therefore, even when the generated power is excessively larger than the predicted value, the surplus of the generated power can be absorbed by the battery 18B.

When the power of the battery 18B together with the generated power is to be fed to the power grid 4 at the prediction time, the upper limit of the target range is set to a higher value when the reliability of the predicted value is low than when the reliability of the predicted value is high. Therefore, even when the generated power is excessively smaller than the predicted value and thus the shortage of the power is larger than predicted, the shortage of the power can be made up for by the power of the battery 18B.

The reliability can be accurately calculated by calculating an error rate from the measured and predicted values of solar radiation of the same time.

Hereinafter, modifications will be described.
In the above embodiment, the CEMS server 2 acquires information on solar radiation at the point where the photovoltaic power generator 15A is installed from the external server 200. However, the CEMS server 2 may directly acquire information on solar radiation at the point where the photovoltaic power generator 15A is installed by using the pyranometer 118 installed at this point.

In the above embodiment, the CEMS server 2 predicts the power generated at the prediction time. However, the CEMS server 2 may predict the amount of power generated during a scheduled power balancing period. For example, the CEMS server 2 may predict the amount of power to be generated during a scheduled power balancing period by multiplying the predicted generated power by the control cycle and accumulating the power to be generated during the scheduled power balancing period (or predetermined period).

In the above embodiment, the CEMS server 2 acquires a predicted value of solar radiation at the point where the photovoltaic power generator 15A is installed from the external server 200. However, the CEMS server 2 may calculate the predicted value of solar radiation at this point by using the history of measured values of solar radiation at this point.

The above embodiment illustrates an example in which one photovoltaic power generator 15A is installed in the microgrid MG. However, a plurality of photovoltaic power generators 15A may be installed in the microgrid MG.

The above embodiment illustrates an example in which the surplus of the power generated by the photovoltaic power generator 15A is absorbed by charging one vehicle 18 or the shortage of the power generated by the photovoltaic power generator 15A is made up for by the power of one vehicle 18. However, a plurality of the vehicles 18 may be used, or at least one vehicle 18 in which the SOC of the battery 18B can be controlled to fall within the target range by the prediction time may be selected from the vehicles 18.

The above embodiment illustrates an example in which the photovoltaic power generator 15A and the battery 18B are used to perform an operation of meeting the power requested by the power grid 4. However, other power sources, consumption equipment, etc. may be combined.

In the above embodiment, a mean absolute percentage error (MAPE) is calculated as an error rate by using the predicted and measured values of solar radiation of the same time, and whether the reliability is high is determined using the error rate. However, the method for calculating an error rate is not limited to this method. For example, the ratio of the measured value to the predicted value (namely, measured value/predicted value) may be calculated as an error rate. Alternatively, the method for determining whether the reliability is high is not limited to the method using the error rate. For example, a plurality of ratios of the measured value to the predicted value may be calculated from the history of predicted values and the history of measured values, and whether the reliability is high may be determined based on whether the calculated ratios are within a predetermined reliable interval.

The above embodiment illustrates an example in which the ECU 18A of the vehicle 18 controls the SOC of the battery 18B. However, for example, the EVSE 17 may be used to control the SOC of the battery 18B.

The above embodiment illustrates an example in which the battery 18B mounted on the vehicle 18 is used as an energy storage device that absorbs the surplus of the generated power and makes up for the shortage of the power. However, a stationary energy storage device may be used, and the present disclosure is not particularly limited to an in-vehicle energy storage device.

The above embodiment illustrates an example in which the margin of the same value α is used to set the first target range and the third target range. However, margins of different values may be used to set the first target range and the third target range.

The above embodiment illustrates an example in which the margin of the same value β is used to set the second target range and the fourth target range. However, margins of different values may be used to set the second target range and the fourth target range.

The above embodiment illustrates an example in which the margins a, 13 are predetermined values. However, the margins a, 13 may be values that are set according to, for example, the predicted value of the generated power, the magnitude of the surplus of the generated power, or the magnitude of the shortage of the generated power.

All or a part of the above modifications may be combined as appropriate. The embodiment disclosed herein should be considered to be illustrative and not restrictive in all respects. The scope of the present disclosure is shown by the scope of claims rather than the above description, and is intended to include all modifications within the meaning and the scope equivalent to the scope of claims.

What is claimed is:

1. A power management system that manages power of a power network installed in a predetermined area, the power management system comprising:
   a photovoltaic power generator installed in the predetermined area and connected to the power network;
   an energy storage device configured to be connected to the power network; and
   a server configured to
      acquire a predicted value of solar radiation at a prediction time at a point where the photovoltaic power generator is installed,
      calculate a predicted value of power generated by the photovoltaic power generator at the prediction time by using the predicted value of solar radiation,
      set a target range of a state of charge (SOC) of the energy storage device by using the predicted value, and control the SOC in such a way that the SOC falls within the target range by the prediction time, and
      set the target range to a wider range when reliability of the predicted value is low than when the reliability of the predicted value is high.

2. The power management system according to claim 1, wherein the server is configured to, when the energy storage device is to be charged with a part of the generated power at the prediction time, set a lower limit of the target range to a lower value when the reliability of the predicted value is low than when the reliability of the predicted value is high.

3. The power management system according to claim 1, wherein the server is configured to, when power of the energy storage device together with the generated power is to be fed to outside of the power network at the prediction time, set an upper limit of the target range to a higher value when the reliability of the predicted value is low than when the reliability of the predicted value is high.

4. The power management system according to claim 1, wherein the server is configured to calculate the reliability by using an error rate calculated from a measured value of solar radiation and a predicted value of solar radiation of the same time.

5. A power management server that manages power of a power network installed in a predetermined area, a photovoltaic power generator installed in the predetermined area and an energy storage device being connected to the power network, the power management server comprising a processor configured to:
   acquire a predicted value of solar radiation at a prediction time at a point where the photovoltaic power generator is installed;
   calculate a predicted value of power generated by the photovoltaic power generator at the prediction time by using the predicted value of solar radiation;
   set a target range of an SOC of the energy storage device by using the predicted value;
   control the SOC in such a way that the SOC falls within the target range by the prediction time; and
   set the target range to a wider range when reliability of the predicted value is low than when the reliability of the predicted value is high.

6. A power management method for managing power of a power network installed in a predetermined area, a photovoltaic power generator installed in the predetermined area and an energy storage device being connected to the power network, the power management method comprising:
   acquiring a predicted value of solar radiation at a prediction time at a point where the photovoltaic power generator is installed;
   calculating a predicted value of power generated by the photovoltaic power generator at the prediction time by using the predicted value of solar radiation;
   setting a target range of an SOC of the energy storage device by using the predicted value;
   controlling the SOC in such a way that the SOC falls within the target range by the prediction time; and
   setting the target range to a wider range when reliability of the predicted value is low than when the reliability of the predicted value is high.

* * * * *